United States Patent
Reh et al.

[15] 3,672,069
[45] June 27, 1972

[54] FLUIDIZED-BED COOLER AND METHOD OF COOLING PARTICULATE SOLID MATERIAL

[72] Inventors: Lothar Reh, Bergen Enkheim; Werner Hans Schmidt, Frankfurt; Karlheinz Rosenthal, Neu-Isenburg, all of Germany

[73] Assignee: Metallgesellschaft Aktiengesellschaft, Frankfurt am Main, Germany

[22] Filed: Feb. 20, 1970

[21] Appl. No.: 13,130

[30]  Foreign Application Priority Data

Feb. 22, 1969  Germany ..................... P 19 09 039.2

[52] U.S. Cl. ........................................ 34/20, 34/57 A, 75/26
[51] Int. Cl. .......................................... F26b 7/00, F26b 17/00
[58] Field of Search ......................... 34/20, 57 A, 57 C, 57 D; 209/474; 165/104; 75/26, 23

[56]  References Cited

UNITED STATES PATENTS

| | | | |
|---|---|---|---|
| 2,419,245 | 4/1947 | Arveson | 34/57 A |
| 2,797,908 | 7/1957 | Zubrzycki | 34/57 A |
| 2,876,975 | 3/1959 | Short | 34/57 A |
| 2,891,320 | 6/1959 | Buff | 34/57 A |
| 3,264,751 | 8/1966 | McEntee, Jr. | 165/104 |
| 3,362,083 | 1/1968 | Galer | 34/57 |
| 3,546,787 | 12/1970 | Horner et al. | 34/57 A |

FOREIGN PATENTS OR APPLICATIONS

| | | | |
|---|---|---|---|
| 1,345,666 | 11/1963 | France | 34/57 A |
| 693,868 | 7/1953 | Great Britain | 165/104 |

*Primary Examiner*—Winston A. Douglas
*Assistant Examiner*—M. J. Andrews
*Attorney*—Karl F. Ross

[57]  ABSTRACT

A fluidized-bed heat exchanger in which a plurality of compartments are arranged side by side and are separated by respective baffles forming weirs or overflow arrangements whereby particle transfer is from one compartment to another and each compartment is fluidized by the introduction of carrier or fluidizing gases from below. Within the individual compartments, heat exchangers are provided and are connected to conduct a cooling fluid from compartment to compartment countercurrent to the direction of movement of the particles. The cooling means or heat exchangers may be tube coils connected in series.

8 Claims, 9 Drawing Figures

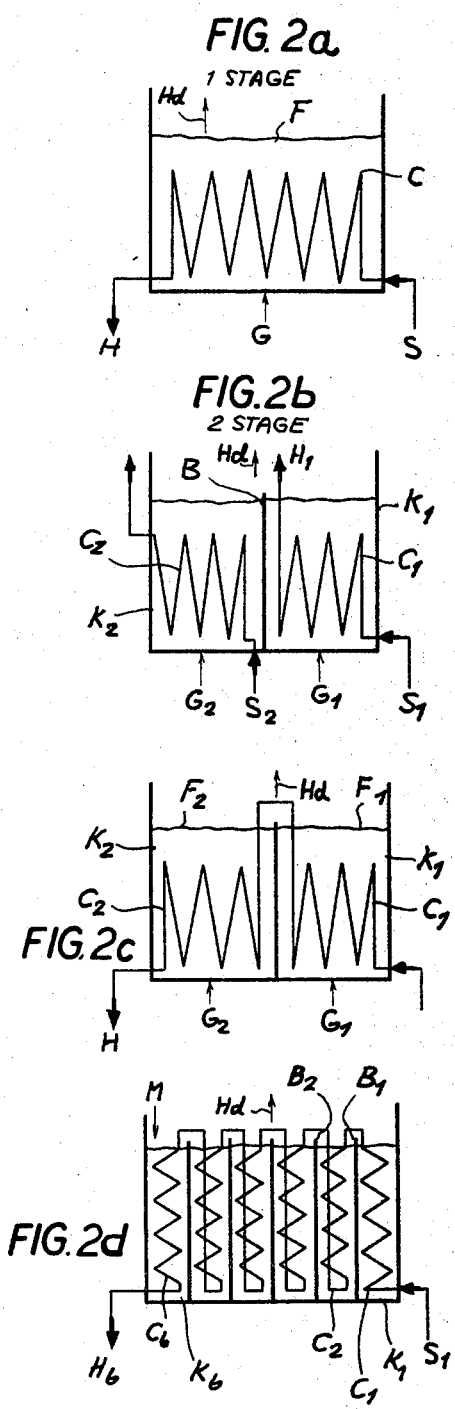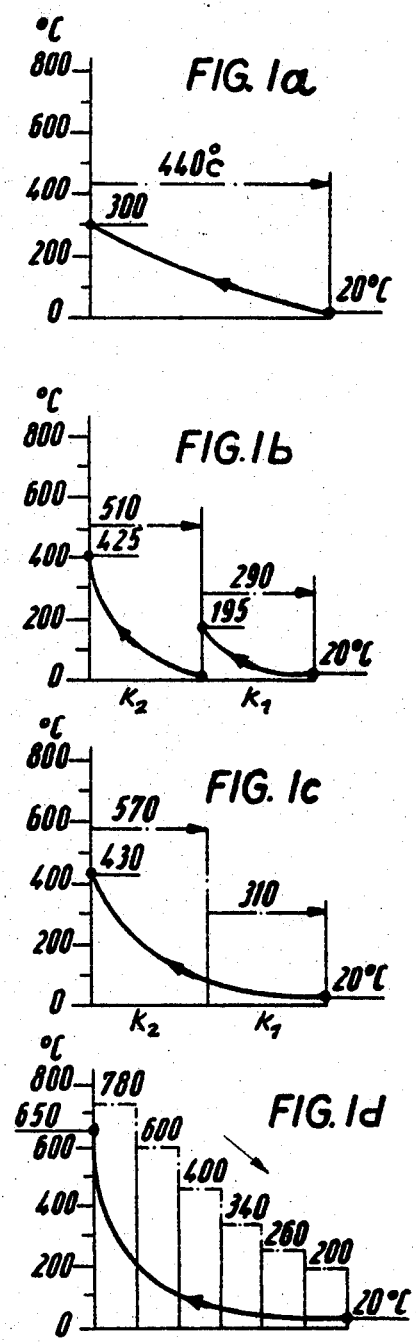

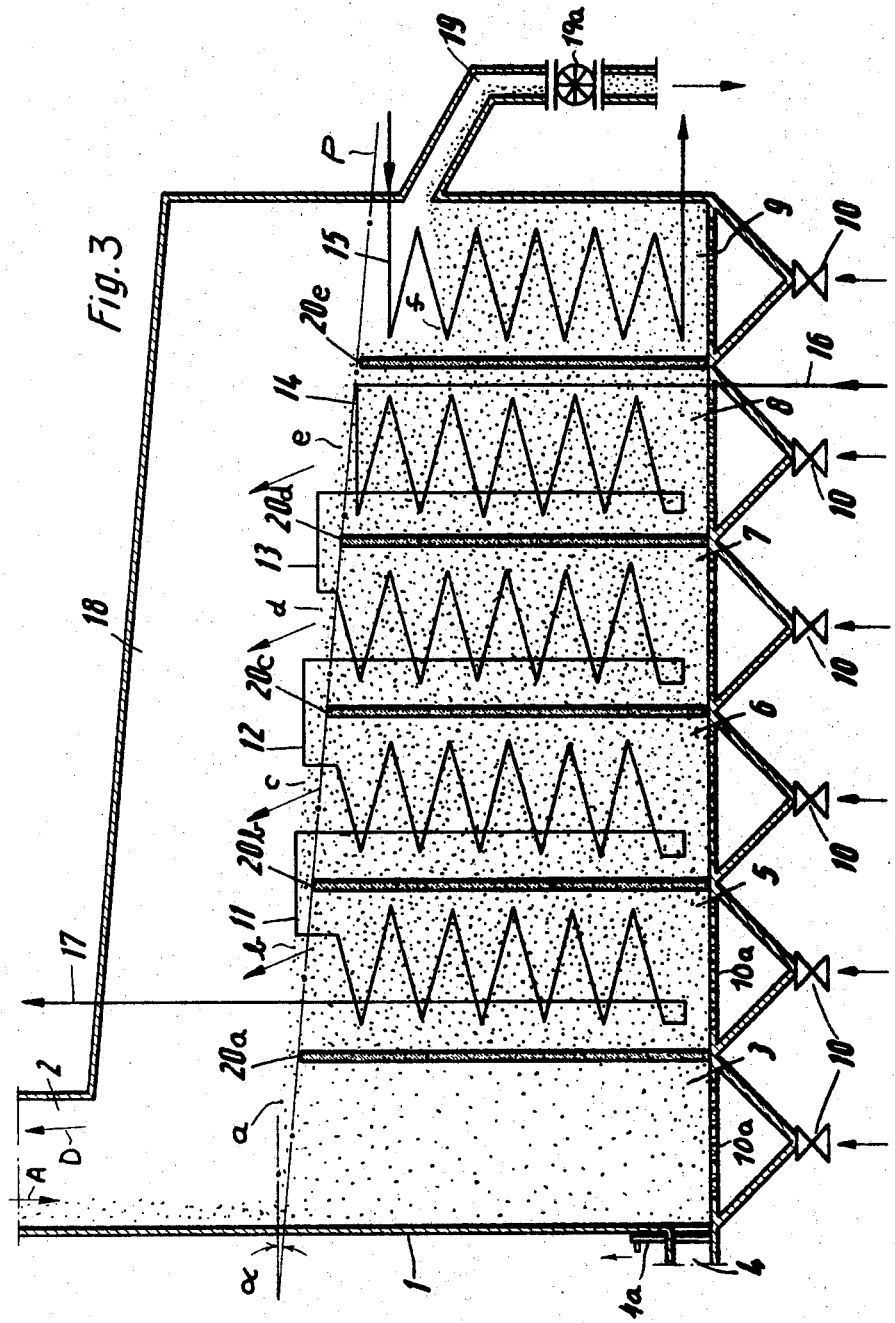

FLUIDIZED-BED COOLER AND METHOD OF COOLING PARTICULATE SOLID MATERIAL

FIELD OF THE INVENTION

Our present invention relates to fluidized-bed heat exchangers and, more particularly, to a fluidized-bed cooler for cooling hot fluent materials by direct or indirect heat exchange.

BACKGROUND OF THE INVENTION

It is known to provide a heat exchanger adapted to cool particulate, comminuted or fine-grain material by a countercurrent flow of the material and a cooling gas, such that the solids act as a suspension in the gas stream. Such solids in suspension are generally said to be fluidized and the fluent layer may be defined as vortex layers or fluidized beds. Fluidized beds have been proposed in a number of industrial and technological applications and are known for combustion, roasting and calcination processes in the treatment of mineral matter and in the handling of metallurgical ores. Fluidized beds have also been proposed for use in chemical reactors in which the fluent solids may induce or promote catalytic processes or reactions of a monophase or polyphase character. It has also been suggested to maintain the fluidized bed as a migrating layer of fluent solids which travel from an inlet side to an outlet side through special locks, limiting the amount of solid material which may migrate downstream and retaining a predetermined proportion of the solids for a statistically constant residence time at each section of the treatment path. These systems are generally fluidized-bed reactors which may be used for calcination or the like.

Heat-transfer problems are found to arise in such systems although fluidized-bed techniques offer numerous advantages because of the increased contact-area/mass ratio across which heat exchange may occur and reaction promoted.

OBJECTS OF THE INVENTION

It is, therefore, the principal object of the present invention to provide an improved heat-exchange system using fluidized-bed principles but avoiding disadvantages of earlier fluidized-bed systems.

It is also an object of our present invention to provide a method of effecting heat exchange, with improved efficiency, between gases, liquids and solids.

A further object of the instant invention is to provide an improved apparatus for carrying out such heat exchange and especially the cooling of fluent solids materials whereby disadvantages hitherto encountered may be eliminated, reduced or overcome.

SUMMARY OF THE INVENTION

These objects and others which will become apparent hereinafter, are attained, in accordance with the present invention, with a fluidized-bed cooler manifesting better utilization of the coolant and which can be effectively combined with a high-temperature reactor consuming hot gas, with greater thermal economy than has hitherto been the case.

The fluidized-bed heat exchanger, especially as a cooler for reducing the temperature of flowable solid materials and obstructing sensible heat therefrom, comprises a plurality of chambers connected in succession or series and provided with means for sustaining in each of the chambers a relatively thick fluidized bed or vortex layer, in fluent material passing in succession through these chambers.

The term "thick layer" is used herein to define a layer which is substantially columnar in each chamber, i.e. has a relatively large height but relatively small width, the latter being measured in the direction of migration of the fluent solid materials from chamber to chamber, i.e. from an inlet chamber at the upstream side of the apparatus to a discharge chamber at the downstream side thereof.

The present invention provides a series of baffle walls between the adjoining chambers. Within the chambers, there are provided, in accordance with an essential feature of the invention, respective heat-exchange means or colling devices which are interconnected in series for countercurrent flow of a fluid other than the carrier or fluidizing gas through the chambers in indirect heat exchange with the solids and gases thereof. The heat-exchange means, preferably coils, tube bundles or nests enable a flow of coolant and of the fluent solids in opposite directions. Another feature of this invention resides in the provision of collecting means, e.g. a hood common to the several cooling chambers for combining the fluidizing or carrying gases emerging therefrom.

According to a specific feature of this invention, the fluidized-bed cooler comprises four or more cooling chambers which are formed at their bottoms with gas distributors through which a gaseous coolant is fed for a direct cooling of the fluent solids in these chambers. The term "direct" heat exchange is here used to refer to a heat transfer between the two materials without conduction through an intervening member, such as a thermally conductive wall. Hence, since the fluidizing gases contact the particles of the material to be cooled directly, there is a direct heat exchange between them. On the other hand, the coolant traversing the heat-exchange means is in "indirect" heat exchange with both the solids and the carrier or fluidizing gas because heat transfer is effected through the walls of the heat-exchange means.

According to another feature of this invention, the baffle walls between the successive chambers are of decreased height in the downstream direction so as to constitute respective weirs across which the fluidized solids migrate and a backflow of the solids is precluded. Mixing of hot material with cold material is thereby avoided. While it is possible, within the purview of the present invention, in spite of the decreasing of level of the baffle walls or partitions, to maintain the same layer thickness in each of the chambers, e.g. via lowering of the floor or gas distributor proportionally, we prefer to maintain the gas distributors substantially coplanar and thus to decrease the thickness of the layer in the downstream direction. Advantageously, the baffle walls or partitions are composed at least in part of thermally insulating material or are otherwise constructed and arranged to limit or suppress conduction of heat from one chamber to another through the walls of the apparatus.

The discharge or final or outlet chamber may be provided with an independent heat-exchange means, e.g. tube coil, nest or bundle, traversed by water and designed to remove residual heat energy. To avoid mechanical damage to the cooling chambers by an ingress of foreign matter, such as lining material from the preceding fluidized bed reactor or some other treatment furnace, the first cooling chamber may be preceded by an inlet chamber or collection chamber in which a fluidized bed is also maintained but foreign matter is permitted to sediment or settle because of its higher density. Such foreign matter may be withdrawn as required and, to this end, means is provided adjacent to the gas distributor of the inlet chamber to enable withdrawal of such foreign matter. The fluidizing gas (e.g. air) emerging from the collection chamber may be combined in the aforementioned hood with the fluidizing gases from the cooling chambers.

It will be appreciated that, when the velocity of the fluidizing gas in the several cooling chambers is properly selected, an optimum heat transfer between the fluidized beds and the cooling devices lying in these beds will be obtained.

The optimum heat transfer coefficient, with respect to the pressure thereof across the system will, of course, depend upon a suitable selection of the gas velocity and appropriate design of the heat exchangers or cooling means in the cooling chamber. However, the same questions govern the size of a configuration for the heat exchanger in these compartments as control the design of heat exchangers of the tube-bundle type. The velocity of the gases used for direct and indirect heat exchanges may be controlled to vary the heat transfer communication so as to effect a heat transfer primarily either by the direct-acting coolant or by the indirectly acting coolant.

The gaseous coolant may, of course, consist of any gas and even liquids may be passed through the coils of the tube bundles. The fluidized gas and the gas traversing the heat exchangers within the compartments may be of the same or different types and indeed may either be mutually antagonistic or interreactive. In combined operations, i.e. operations in which the fluidized bed cooler is used in conjunction with a fluidized-bed reactor (for example in the roasting or calcination of metallurgical solids), the gases used as the coolant may be fed as a temperature-controlling gas to the high-temperature reactor, or to supply some other heat carrier with the thermal energy which has been extracted from the hot solids.

If the hot solids derive from a furnace and are not sensitive to oxidation, e.g. as a solid recovered from a calcination furnace or kiln, air is the preferred coolant for both direct and indirect heat exchangers and the heated air is then fed to the calcination process. If the volume rate of flow of the air necessary in the calcination is less than that necessary in the cooling process, saturated steam may be used as a gaseous coolant and is passed through the coils so as to be heated in the cooling arrangement and constitute an energy carrier suitable for other purposes.

In general terms, however, the fluidized-bed coolant according to the invention may be used in any process in which hot gases are generated or desired. For example, the system may be used for the abstraction of heat from hot exhaust gases generated in industrial plants or the like. Hot flue gas can be cooled for use as a fluidizing agent or prior to release into the atmosphere by feeding it, as the fluidizing gas, through the gas distributors of cooling compartments in accordance with the present invention, the compartments being charged with an inert material such as sand. The hot fluent gas is cooled, both by heat transfer to the flowable solids and by heat migration through the heat exchangers within these compartments by transfer to some other fluid. Some of the heat retained in the solids may be picked up by another gas passed through the cooling compartments, although most of the heat transfer from the fluent gas will be indirect, i.e. by transfer to the particulate material and then to the fluid traversing the heat exchanger through the walls thereof.

In a fluidized-bed process for volatilization of nonferrous metals from calcines by a chlorination of the nonferrous metals, part of the heat contained in the hot material which is discharged from the fluidized-bed reactor in which the chlorination has been effected, may be transferred directly or indirectly to chlorine gas which is introduced as the chlorinating medium in a reactor.

In general, we have found that the fluidized-bed cooler of the present invention affords a maximum cooling rate with cooling gases having a minumum pressure drop and even a minimum flow rate while the static cooler surface has a minimum area. The apparatus can thus have relatively small overall dimensions when compared with other heat-exchanger systems and is particularly significant in achieving thermal economy when the gas heated in the cooler is to be used as a feed for a high-temperature process.

DESCRIPTION OF THE DRAWING

The above and other objects, features and advantages of the present invention will become more readily apparent from the following description, reference being made to the accompanying drawing, in which:

FIGS. 1A–1D represent graphs of the thermal characteristics of various cooling processes;

FIGS. 2A–2D represent diagrammatically the corresponding processes; and

FIG. 3 is a vertical cross-sectional view through a cooler embodying the principles of the present invention.

SPECIFIC DESCRIPTION

In the following discussion in which various coolers are compared, the comparison is made with the understanding that the bulk rate of flow of materials to be cooled, the total heat-transfer areas of the tube coolers, the external dimensions and the rate of coolant flow, in this case air flow, and the materials from which the apparatus is constructed and of which the solids are formed, are all identical. Furthermore, the solid material may be considered to be $Al_2O_3$.

In the single stage cooler illustrated in FIG. 2A, a uniform mixed temperature of 440° C is maintained throughout the fluidizing bed F which is maintained in its vortex motion by a carrier gas introduced through a gas distributor at G. The indirect cooling coil C is supplied with air at S, the heated gas being recovered at H. The solids were delivered at 1,100° C. The temperature within the fluidizing bed is represented in dot-dash line in FIG. 1A. The temperature of the indirectly heated air ranges from 20°C at the inlet to about 300° C at the outlet while the temperature of the fluidized gas recovered at $H_d$ ranges to about 440° C. The cooled material is discharged in a temperature of about 440° C.

When the baffle wall B is provided to subdivide the cooler into a two-stage unit with compartments $K_1$ and $K_2$ provided with independent streams of fluidizing gas at $G_1$ and $G_2$ with the effluent gases being recovered in common at $H_d$, each compartment was provided with a separate coil $C_1$ and $C_2$ in inlets $S_1$ and $S_2$ and $H_1$ and $H_2$ respectively. Each chamber is supplied with half the fluidizing air and with half the indirect cooling air while the fluidizing gases emerge at 290° C and 510° C from the two stages and may be combined with appropriate temperature averaging. The indirectly heated air streams are brought from starting temperatures of 20°and 195° C and 425° C, respectively. The temperature of the combined gas streams from the compartments is 380°C for the directly heated gas and is 300°C for the indirectly heated gas. The cooled material, which travels from compartment $K_2$ to compartment $K_1$ and is then discharged is initially at a temperature of 1,100°C and finally is recovered at a temperature of 290°C.

A two-stage series system in accordance with the principles of the present invention has been illustrated in FIG. 2C. The coils $C_1$ and $C_2$ are connected in series while the compartments $K_1$ and $K_2$ with the fluidized beds $F_1$ and $F_2$ are directly cooled by fluidizing gas streams $G_1$ and $G_2$ in parallel the combined gases being recovered at $H_d$. In this arrangement, the temperature of the gases emerging at H is increased to 430°C while the temperature of the combined fluidizing gas is found to be 420°C. While the cooled material is discharged at a temperature of about 310°C the temperature of the mixed bed $F_1$ in compartment $K_1$ is 310°C while the temperature of the mixed bed $F_2$ in compartment $K_2$ is 570°C.

A six-stage system in accordance with the present invention has been illustrated in FIG. 2D and again, the solid material is introduced at M into the first cooling compartment $K_6$ and travels downstream to the discharge compartment $K_1$. The bafflers are partitions $B_1$, $B_2$ etc. are provided between the compartments whose heat exchanger coils $C_1$, $C_2$ . . . $C_6$ are connected in series to conduct the cooling air counter current to the recovered solids. The indirectly heated air is brought from a temperature of 20°C at $S_1$ to a temperature of 650°C at $H_6$ while the fluidizing gas is collected at $H_d$ with a temperature of 200°C. The cooled solids are recovered at a temperature of 200°C.

In FIG. 3, we have shown a fluidized bed cooler embodying the present invention. In this structure, the housing 1 is subdivided by a plurality of vertical partitions 20a–20e of progressively decreasing height so as to define respective levels a–e of fluidized beds in the preceding chambers 3 and 5–8, respectively. The level f of the outlet chamber 9 is defined by an overflow 19 through which the solids are removed.

The fluidized-bed cooler 1 thus comprises a charging shaft 2 through which comminuted solids are introduced into the collector chamber 3 as represented at arrow A, preferably from a calcining apparatus. The shaft 2 also serves to recover hot gases which are led away from a collecting hood 18 overlying the compartments as shown by the arrow D. Between the collector chamber 3 and the discharge chamber 9 there are four cooling chambers 5–8 which receive individual streams of cooling and fluidizing gas through respective gas distributors 10a, valves 10 and any customary source of fluidizing gas, e.g. a compressor or blower.

Cooling devices 11–14 are disposed in the cooling chambers 5–8 and may consist of tube coils, nests or bundles of conventional indirect heat-exchanger construction. These heat exchangers are supplied with a coolant via the conduit 16 and deliver the coolant at 17. Thus the coolant flows from heat exchanger to heat exchanger in counterflow to the movement of the particulate solids through the cooling chambers. Furthermore, this coolant is generally a gas.

In the discharge chamber 9, there is provided an independent heat exchanger or cooler 15 which is supplied with a liquid coolant and abstracts the last amounts of recoverable heat from the solids passing from this chamber. The hood 18 collects the heated cooling gases introduced through the gas distributors 10a of all of the chambers 3 and 5–9. The cooled material, in turn, is discharged through the overflow 19 via a metering assembly 19a. Foreign matter sedimented in the chamber 3 may be removed via an opening 4 and a door 4a.

SPECIFIC EXAMPLES

Example I 10 metric tons of calcined alumina from a rotary kiln at a temperature of 1,200°C are charged through the shaft 2 into the furnace illustrated in FIG. 3 and are fluidized in the inlet or collecting chamber 3 thereof. In chamber 3, fluidizing air is introduced through the gas distributor. In that chamber, the lumps of alumina which have aggregated during calcination and thus are too heavy to be fluidized successfully, are sedimented and recovered at 4. The lumps can be comminuted further with the resulting product returned to the inlet chamber.

From the chamber 3, the fluid solids are passed through five cooling chambers 5–9 fluidized by air introduced through the gas distributors and respective manifolds. The total fluidizing-air flow rate is 4,700 m³/hour STP. The valves 10 ensure uniform distribution of the fluidizing air among the chambers 3 and 5–9. The hood 18 collects the heated fluidized air (first coolant) which is delivered to the rotary kiln for use as the combustion air. The air thus recovered has a temperature of 445°C.

Interconnected tube banks 11–14 are suspended in the chambers 5–8 and are used to conduct the second coolant, namely air, in indirect heat exchange with the contents of the furnace. The baffle walls 20a to 20e are thermally insulated to prevent virtually any heat exchange by conduction through the walls. The walls are of progressively decreasing height along an imaginary plane P which defines with a horizontal an angle α of about 1.5°. This orientation eliminates backflow of cooled solids.

The direct cooling with the fluidizing air provides temperatures decreasing in steps from the first cooling chamber 5 to the last cooling chamber 8 and, under the conditions described, cooling chamber 5 is found to be maintained at a temperature of about 650°C, cooling chamber 6 at a temperature of 500°C, cooling chamber 7 at a temperature of 380°C and cooling chamber 8 at a temperature of 240°C. In each cooling chamber, the air flowing through the tube banks in counterflow to the solids produces a temperature difference across the walls of the tube bank to promote heat exchange between the contents of the cooling chambers and the gas traversing the tube banks.

The final cooling of the solids to a temperature of about 80°C is effected by the passage of water at a rate of 15 m³/hour through the coil 15 within the cooling chamber 9. The lock 19a seals the discharge conduit 19 against air passage. The air traversing the heat exchanger 11–14 at a rate of 9,400 m³/hour STP is indirectly heated to a temperature of 500°C and is supplied as combustion air to a rotary kiln.

Example II

The fluidized-bed cooler is essentially identical to that of FIG. 3 except that only three cooling chamber 5–7 are employed, the cooling chamber 8 being eliminated. Roasted pyrites from a fluidized-bed roasting kiln are introduced at a temperature of 960°C and at a rate of 10 metric tons/hour into the fluidized-bed cooler.

Feed water, intended for the generation of steam, is supplied at 13 metric tons/hour to the coil 15 in which it is preheated to 95°C in discharge chamber 9 by indirect heat exchange. The preheated feed water is supplied to a steam-generating boiler in which the water is evaporated and the steam partly superheated.

The steam, superheated and at a temperature of 315°C, is returned to the fluidized-bed cooler and at a temperature of 40 kg/cm² (gauge) is passed through the heat exchangers 13, 12 and 11 in counterflow to the movement of the solids through the chambers 5–7. The steam emerges at a temperature of 450°C and a pressure of 40 kg/cm² (gauge) and expanded, for example, in a turbine. The superheating of the steam is found to be readily controllable and free from overheating of the tubes.

The roasted pyrites are fluidized by 2,500 m³/hour STP of air distributed uniformly through the chambers 3, 5–7 and 9 and the collected fluidizing air has a temperature of 390°C. Dust trained with the fluidizing air is recovered in a cyclone and returned to the cooler while the air may be used in the roasting process as a reactant. The calcine is cooled to a temperature of 150°C.

Example III

Using the fluidized-bed cooler of Example I, fine-grained sponge iron having an average particle size of about 190 microns and a temperature of 980°C is cooled at a rate of 15 metric tons/hour. The fluidizing gas consists of 50 percent by volume water capor and 50 percent by volume carbon monoxide and is supplied to the chambers 3 and 5–9 by a rotary piston blower at 4,600 m³/hour (STP). Air at a rate of 6,400 m³/hour STP is led through the heat exchanger 14–11 and is raised in temperature from about 40° to 550°C. In chamber 5, a temperature of about 590°C is sustained whereas the temperatures of chamber 6–8 are respectively 415°C, 280°C and 190°C. The fluidized gas collected at 18 has a temperature of 305°C while the sponge iron powder is cooled to 60°C in chamber 9 with water passed through the tube coil 15.

The improvement described and illustrated is believed to admit the many modifications within the ability of persons skilled in the art, all such modifications being considered within the spirit and scope of the invention except as limited by the appended claims.

We claim:

1. A method of cooling particulate solid material, comprising the steps of:
   a. passing said solid material through a succession of cooling chambers in a thick layer only by overflow of the solid material from one column to the next while thermally isolating each chamber from the adjacent chamber;
   b. fluidizing the material in each of said chambers by passing a first cooling fluid upwardly therethrough while abstracting heat from said material and thereby heating said first cooling fluid; and
   c. passing a second cooling fluid through each of said chambers individually but in succession in a direction opposite the direction of movement of the solid material from chamber to chamber and, within each chamber, in counterflow to the movement of the solid material therethrough but in indirect heat exchange with the contents of said chambers to abstract further quantities of heat from said solid material and thereby heat said second fluid.

2. The method defined in claim 1, further comprising combining the heated first cooling fluids emerging from said chambers.

3. The method defined in claim 2 wherein said particulate solid material is the product of a fluidized-bed reactor, further comprising the steps of:

d. fluidizing the solid material in an inlet chamber upstream of the first of said cooling chambers to settle contaminants from said solid material, the fluidization of the solid material in said inlet chamber being effected with a upward flow of said first cooling fluid, the heated first cooling fluid emerging from said inlet chamber being combined with the heated first cooling fluid emerging from said cooling chambers;

e. passing the solid material from the last of said cooling chambers into a discharge chamber and fluidizing the solid material in said discharge chamber with said first cooling fluid while combining the heated first cooling fluid from said discharge chamber with the heated first cooling fluid from said cooling chambers;

f. passing water through said discharge chamber in indirect heat exchange with the contents thereof and independently of the cooling of the remainder of said chambers; and g. feeding at least one of said first and second fluids to said reactor.

4. The method defined in claim 3 wherein said one of said fluids is chlorine gas, steam or air.

5. A fluidized-bed cooler for cooling particulate solid material, comprising:

housing means defining a succession of cooling chambers for passing the solid material in a thick fluidized bed from chamber to chamber therealong, said housing means including thermally insulated walls of progressively diminishing height spaced along said housing means from an upstream end thereof toward a downstream end;

means for passing a first cooling fluid upwardly through said chambers for cooling and fluidizing the solid material in said chambers while abstracting heat from said material and heating said first cooling fluid;

multiple-convolution heat-exchanger means in and individual to each of said cooling chambers for passing a second cooling fluid through said chamber generally in counterflow to the movement of the solid material through said chambers but in indirect heat exchange with the contents of said chambers to abstract further quantities of heat from said solid material while heating said second fluid, and means for passing said second fluid into and out of each of said heat-exchanger means through the top of the respective chamber and for conducting said second fluid in series through the individual heat-exchanger means from said downstream toward said upstream end.

6. The cooler defined in claim 5 wherein said housing means includes means for collecting the heated first cooling fluid emerging from said cooling chamber.

7. The fluidized-bed cooler defined in claim 5, further comprising:

means forming an inlet chamber upstream of the first of said cooling chambers for receiving said solid material and transferring it to said first cooling chamber; and means for fluidizing the solid material in said inlet chamber while permitting contaminants to settle therein.

8. The fluidized-bed cooler defined in claim 5, further comprising:

means forming a discharge chamber downstream of the last of said cooling chambers and receiving the solid material therefrom;

means for fluidizing the solid material in said discharge chamber; and further heat-exchanger means independent of the first-mentioned heat-exchanger means and traversed by a liquid coolant for abstracting further quantities of heat from said solid material.

* * * * *